United States Patent
Nascimben

(10) Patent No.: US 6,702,268 B1
(45) Date of Patent: Mar. 9, 2004

(54) VACUUM LOCKING SYSTEM FOR PANELS TO BE WORKED

(75) Inventor: Marco Nascimben, Maron di Brugnera (IT)

(73) Assignee: Heian Europe S.R.L., Maron di Brugnera (IT)

( * ) Notice: Subject to any disclaimer, the term of this patent is extended or adjusted under 35 U.S.C. 154(b) by 0 days.

(21) Appl. No.: 09/719,912
(22) PCT Filed: May 28, 1998
(86) PCT No.: PCT/IT98/00140
§ 371 (c)(1),
(2), (4) Date: Jan. 29, 2001
(87) PCT Pub. No.: WO99/61206
PCT Pub. Date: Dec. 2, 1999

(51) Int. Cl.$^7$ ................................................ B25B 11/00
(52) U.S. Cl. ............................................. 269/21
(58) Field of Search .......................... 269/21, 266, 303, 269/304; 294/64.1, 65; 51/235; 279/3; 248/362, 363, 206 R

(56) References Cited

U.S. PATENT DOCUMENTS

| | | | | |
|---|---|---|---|---|
| 4,684,113 A | * | 8/1987 | Douglas et al. | 269/21 |
| 5,364,083 A | * | 11/1994 | Ross et al. | 269/21 |
| 5,372,357 A | * | 12/1994 | Blaimschein | 269/21 |

* cited by examiner

Primary Examiner—Robert C. Watson
(74) Attorney, Agent, or Firm—Harrison & Egbert

(57) ABSTRACT

Apparatus and method for the fixing of panels to be worked by vacuum suction with suction holes using at least one plane with selectively liftable and lowerable small pistons as a support for the panel to be worked. The same small pistons are lifted and lowered by the pressure differential clearance, respectively the lifting ones with respect to the lowering ones and vice versa, along orthogonal lines.

2 Claims, 2 Drawing Sheets

VACUUM LOCKING SYSTEM FOR PANELS TO BE WORKED

BACKGROUND OF THE INVENTION

1. Field of the Invention

The present invention related to a vacuum locking system for panels to be worked.

2. Description of Related Art

The preferential application, even if not a limitative one, concerns the manufacturing of wooden panels and the like such as hardboard, medium density etc., in the field of furniture and in particular panels for furniture, preferentially small doors, which as it is known should be moulded (shaped in their profiles) and eventually provided with mirrors (shaped inside in order to contain the known mirrors or central small mirrors).

For these types of manufacturing the panel to be worked is generally locked on a working table provided with a large plurality of holes and beneath which the vacuum is obtained in order to lock, the panel to be worked (See European Patent EP-A0505668 (issued to GPM GESELLSCHAFT F üR FERTIGUNG UND MASCHINENBAU AGon Sep. 30, 1992) This European patent discloses a working table with vacuum aspiration for tool machines having a plurality of suction caps.

It very often occurs that, because the panels to be worked are often of different size, it is necessary to use an under-panel which has such an extension to cover all the holed planes of the working table with a series of holes on said under-panel which extend only inside of the extension surface of the overhanging panel to be worked.

This invention is obviously for avoiding that the holes beyond the panel covering range remain uncovered and that the vacuum suction effect for the panel locking is reduced.

Such a system though, requires to change always the under-panel each time that the panel to be worked needs to change dimension.

In fact there is not only the problem of allowing the functioning only of the vacuum holes concerning the surface of the panel to be worked, but also that of supplying the panel to be worked with a rising capability in order to allow a rational and complete profiling and shaping of the same panel. Therefore, when the panels are manufactured by the flanging milling machines (moulding machines), the flanging milling machine may protrude beyond the level of the lower surface of the panel to be worked.

For such reasons, the under-panel (more or less of the same material) also acts as a spacer and thus it also is etched by the tool jutting.

This fact forces the operator to change the under-panel when the type of panel to be worked changes.

BRIEF SUMMARY OF THE PRESENT INVENTION

The purpose of the present invention is that of obviating the above mentioned drawbacks and in particular of realizing a vacuum fixing plane for panels to be worked of any size and with no need of placing an under-panel beneath it.

The problem is solved and the purpose reached as claimed by realizing a plane equipped for the fixing on it by attraction of a panel to be worked, of the type in which said plane is provided with a plurality of suction caps with axial holes for a vacuum action, wherein:

i said suction axial holes are made within respective reciprocating pistons placed in rows along directions X and Y, which:
  are provided with fluid dynamic lifting and lowering means;
  during the lifting said means enable to open a suction passage in said suction axial hole and during the lowering said means enables closing it;
characterized in that:
ii said fluid dynamic lifting and lowering means consist of a series of fluid dynamic ducts which for each row in said two directions X and Y connect each reciprocating piston with the adjacent one, one series of ducts in one direction for the lifting and a second series of ducts in a second orthogonal direction for the lowering of the reciprocating pistons, and this in such a way that said involved pistons are made to work in lifting or lowering by the pressure difference of said series of ducts along direction X and Y, only in the area programmed for a corresponding panel to be worked.

Thus the immediate advantage of lifting the panel to be worked from the underlying supporting plane and simultaneously applying the vacuum suction only to the small pistons lifted beneath the panel to be worked is obtained, while the other small pistons will remain lowered, thus allowing also an easy manufacturing of the whole panel back.

Thus all the working and manufacturing technology is simplified and improved in productivity.

DESCRIPTION OF THE SEVERAL VIEWS OF THE DRAWINGS

These and other advantages will appear from the following description of a preferential explanatory solution of the realization related to the enclosed drawings.

DETAILED DESCRIPTION OF THE INVENTION

Figures 1, 2, 3:
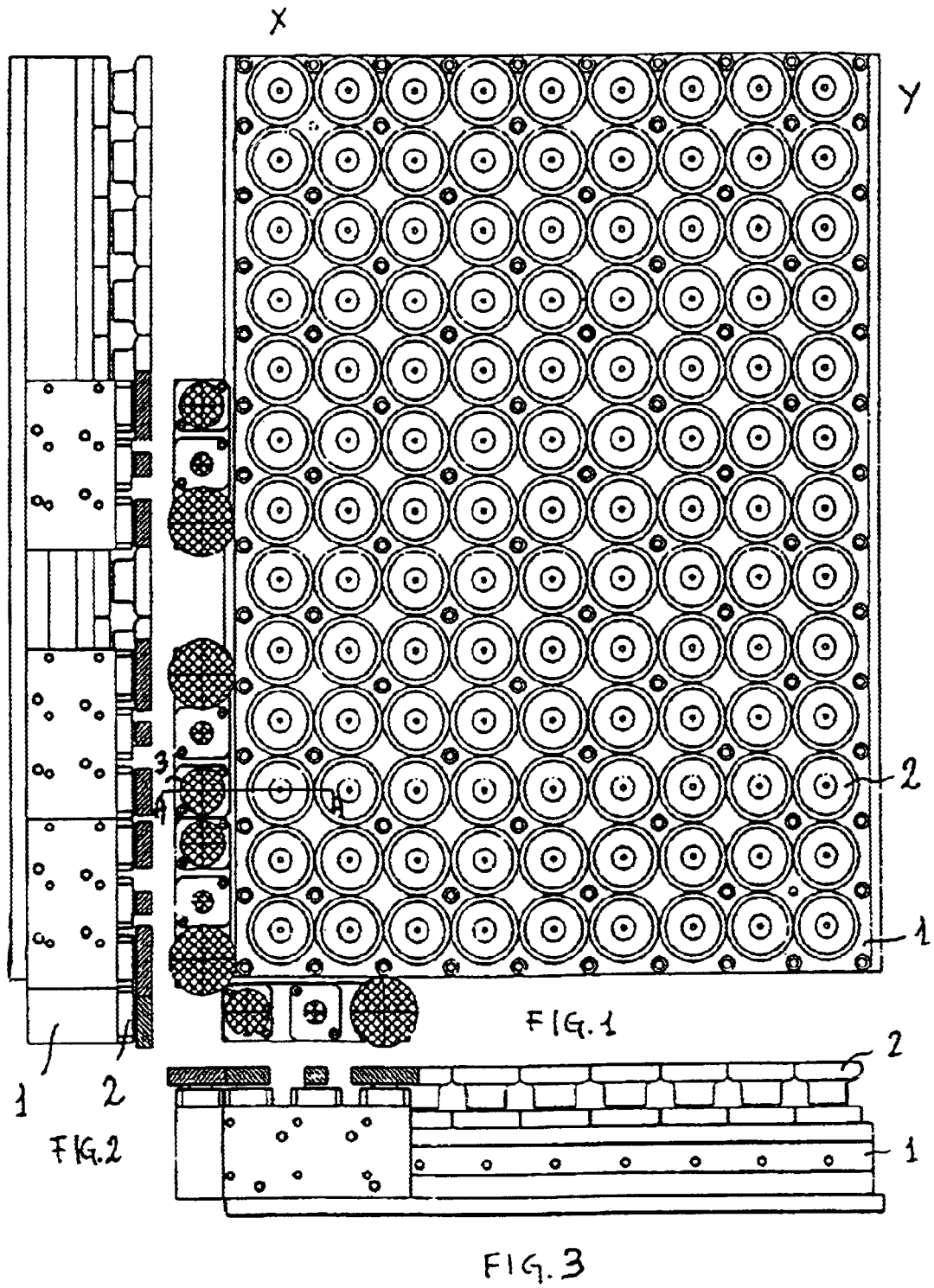
FIG. 1 is a top schematic view of the fixing plane according to the present invention (also more equipped planes of this type on a milling machine may be provided).
FIG. 2 is an enlarged A—A cross section view, of a part of the plane as in FIG. 1 concerning the axial section of a small piston and a respective adjacent stop or positioner of the plane edge.
FIG. 3 is an orthogonal cross section view.

As it can be seen in the figures, there is generally indicated the suction cylinders 1 with reciprocating pistons (2) supporting a plane with the stops or stopping devices or positioners 3 are indicated. X indicates the suction cylinders 2 rows in one direction and Y indicates the rows in orthogonal direction.

Both the suction cylinders 2 and the positioning ones (3) are shaped like a piston stem (31, 20).

The positioning ones have an upper contact ring 311.

In particular the suction small reciprocating pistons (2) in cylinders are placed in orthogonal rows, X, Y, forming a matrix of small reciprocating pistons passing within the supporting plate made up of four pack plates 10,11,12,13.

The bottom plate 11 is hollow for the burying of the drawer-like small piston, in order to interact in opening or closing with a duct 1101 for allowing the vacuum suction passage (201,210) at the suction cup top 21–214 for locking the above panel when the small piston 2 is lifted. When the small piston 2 is lowered the vacuum suction access 1101 is closed as shown in the figure.

The piston stem 20 is guided by guide bushes 17,18,19, 14.

The upper bush is fixed by bolts 15 for locking and extraction for maintenance and replacement.

The whole is provided with sealing gaskets 16.

The suction cup 21,211 engages on the top 202 of the piston stem 20 and the whole is covered by the cup 22 which also acts as a contact delimiter for the upper panel rest.

Once the small piston 2 is lifted, the panel will rest on the cup 22 and the suction cup will adhere supplying the suction through 210–201–1101.

Figure 4:
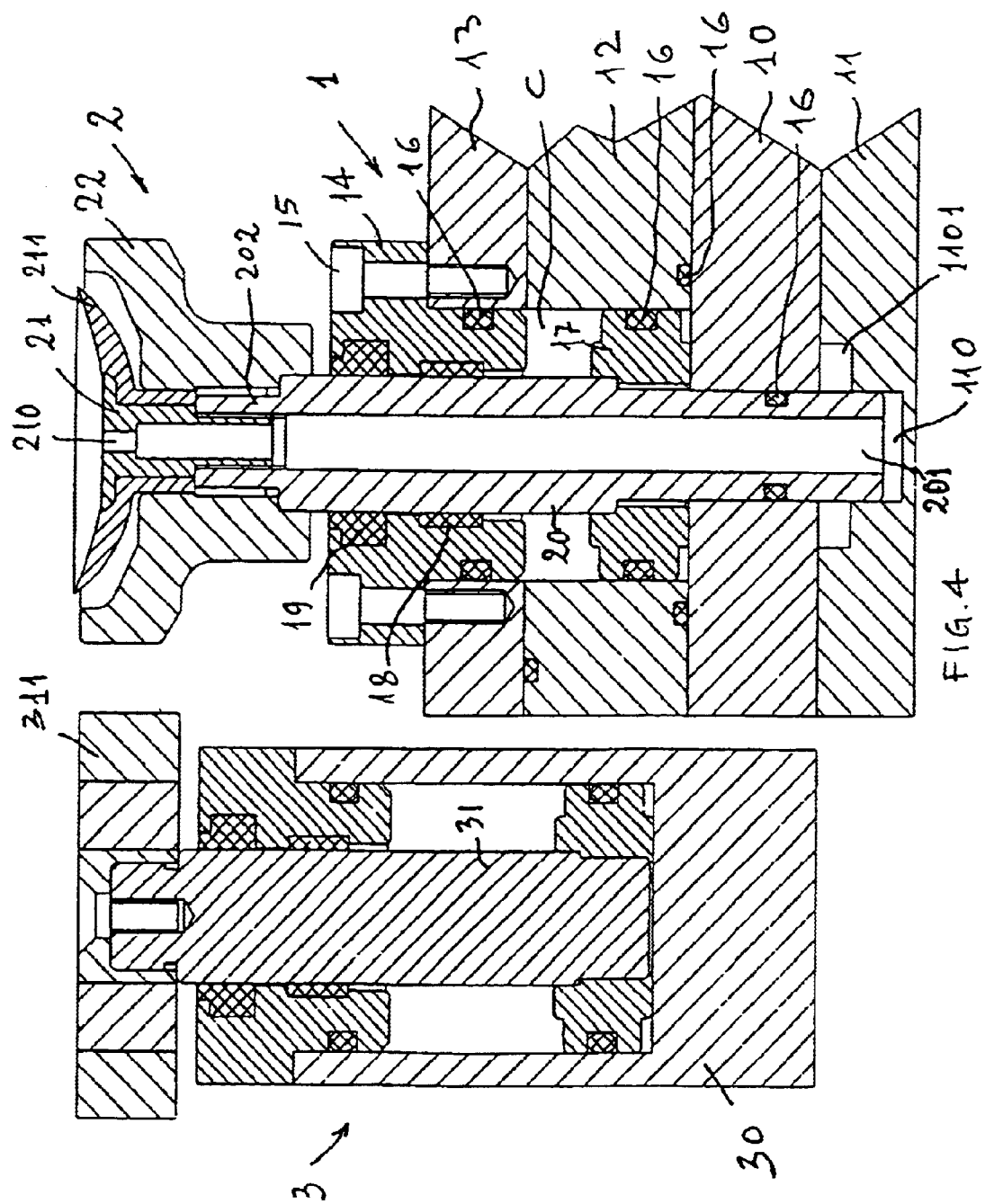
FIG. 4 is a cross sectional enlarged view on the A—A axial plane of a positioner and respective suction cup of one of the suction devices.

A known art device will start up the vacuum by a known suction pump. According to the invention, for each piston (2) a first lowering chamber "C" between the bushes 17 and 14 is provided (visible in FIG. 4) the second lifting chamber (C') being placed below said bush (17) being effaced in the present lower position, (each flowing channel (not shown) from the respective crossing ducts along said rows X,Y being orthogonally symmetrical).

Each chamber-channel "C" intercommunicates with a whole row of said pistons (X) while an orthogonal similar chamber-channel (C') interconnects each orthogonal line Y of the small pistons.

In other words, an intercommunicating lifting line "C–X" and an intercommunicating lowering line "C'–Y" or vice versa is obtained.

For determining the lifting only of the concerned pistons surface. presuming that the X lines control the lifting and the orthogonal lines Y control the lowering:
  a lifting pressure XP is applied to the number of concerned rows X and all the piston of these lines X will be lifted, all of them activated by the vacuum suction;
  a lowering pressure XP>XP is applied in the orthogonal lines which do not concern the attraction surface so that by differential pressure the corresponding not concerned pistons are forced to remain lowered (this operation may be suitably carried out before the other, reducing a movement and obviating to pressure losses).

For being sure that the pistons 2 remain always lowered, a slight pressure pY may be applied in the Y direction to all the pistons, in such a case the lifting pressure PX will have to be higher than pY. Of course this is an operational example, being possible to change the combination as wished, this not being a limitation for the purposes of this invention.

The pistons 2 are lifted by a program selecting the rows of pistons to be activated, so to obtain a square or rectangular shaped area where it is possible to lay the piece to be worked.

The pieces resting area, may be automatically obtained by inputting the piece size in the suitable program.

The advantage of this system thus consists in being able to carry out contouring operations on pieces having different sizes without having to make the suitable fixing forms for each of them.

This system, allows anyway to work with the traditional forms which in this case will be placed directly over the small pistons.

There may be more planes equipped with small pistons of this type for equipment, and these may be activated all together or separately. Each equipped plane is endowed with positioning lateral small pistons, four of which are necessary for positioning the piece on the left side and one on the lower side. These positioners (3) have three different diameters, for a smart interaction with the suction small pistons and a piece centering optimization.

The contouring manufacturing carried out will only be straight along the horizontal axes X, Y and Vertical one, or such to form square or rectangular figures with their sides placed parallel to the axes. Nothing prevents this solution from allowing the carrying out of rounding, bending and chamfering operations, not interfering with the prior art.

In the manufacturing which involves also the lower part of the piece, e.g. with "C" shaped milling machines which laterally reenter under the piece, for preventing the resting small pistons from being damaged by the tool, a suitable re-entry may be provided in the program.

The program may also provide for selecting automatically the positioners and the suction small pistons.

Some alarm means associated to sensors for (he respective small pistons may be provided, thus allowing to obviate the risk of damaging equipment and tools.

The vertical amplitude of the small pistons is about 10 mm. The automatical optimization function of the small pistons, is carried out by means of suitable program controls which will start at the beginning of the operations including the piece width variables ex. X, piece length ex. Y or vice versa, and lateral re-entry of the tool under the piece.

By the program also the prearrangement of the positioners 3 lifting may be provided.

Each area is advantageously made up of 26 small pistons lines in one direction and of 9 small pistons in the other direction, but it is clear that this number may vary as wished. The first two lines are those close to the operator and thus to the positioners 3.

For obtaining the wished hollow area, it will be only necessary to select the two delimiting lines, referring to the respective positioners.

The positioners may be selected on the basis of the wished distance between themselves and the suction small pistons.

The execution details may anyway vary.

I claim:

1. An apparatus for fixing a panel to be marked comprising:
  a plane having a surface suitable for receiving the panel thereon;
  a plurality of suction cups each having an axial hole extending therethrough;
  a plurality of reciprocating pistons respectively supporting said plurality of suction cups therein, the axial hole extending into each of said plurality of the reciprocating pistons, and plurality of reciprocating pistons extending in orthogonal rows along a first direction and a second direction;
  fluid-dynamic lifting and lowering means cooperative with said plurality of reciprocating pistons for opening a suction passage into the axial hole during a lifting of the reciprocating piston and for closing said suction passage to the axial hole during a lowering of the reciprocating piston, said fluid-dynamic lifting and lowering means comprising a series of fluid-dynamic ducts connecting each of said plurality of reciprocating pistons to an adjacent piston of a respective row along said first direction and connecting each of said plurality of reciprocating pistons to an adjacent piston of a respective row along said second direction, one series of fluid-dynamic ducts for lifting the reciprocating pistons, another series of fluid-dynamic ducts for lowering the reciprocating pistons, said one series and said another series being transverse to and crossing each other, said fluid-dynamic lifting and lowering means for lifting and lowering said plurality of reciprocating pistons by a pressure differential between said series of ducts respectively along said first and second directions in a desired area corresponding to an area of working of the panel.

2. A method for fixing a panel to be worked comprising:

forming a plane with a surface suitable for receiving the panel thereon;

positioning a plurality of reciprocating pistons so as to have respective suction cups facing outwardly of said plane, said plurality of reciprocating pistons each having an axial hole extending therethrough so as to have an end opening at the suction cup;

arranging said plurality of reciprocating pistons in orthogonal rows extending in a first direction and in a second direction, said plurality of reciprocating pistons having a first series of fluid-dynamic ducts connecting the plurality of reciprocating pistons having a first series of fluid-dynamic ducts connecting the plurality of reciprocating pistons along said first direction, said plurality of reciprocating pistons having a second series of fluid-dynamic ducts connecting the plurality of reciprocating pistons along said second direction, said first and second series crossing each other;

lifting select pistons of said plurality of reciprocating pistons by a pressure differential between said first and second series so as to lift said select pistons to a surface of the panel;

lowering select other pistons of said plurality of reciprocating pistons by the pressure differential between said first and second series so as to lower said select other pistons away from the surface of the panel;

applying a vacuum pressure through the axial holes of said select pistons so as to secure the surface of the panel to the suction cups of said select pistons; and blocking the vacuum pressure from passing through the axial holes of said select other pistons.

* * * * *